BLOCK DIAGRAM OF ELECTRONIC SYSTEM

United States Patent Office 3,509,349
Patented Apr. 28, 1970

3,509,349
SURFACE FINISH INSPECTION DEVICE UTILIZING A PLURALITY OF LIGHT SOURCES
Joseph L. Molines, Gulph Mills, and Ralph T. Vernot, Philadelphia, Pa., assignors to Philco-Ford Corporation, Philadelphia, Pa., a corporation of Delaware
Filed May 21, 1968, Ser. No. 730,815
Int. Cl. G01n 21/16; H01j 39/12
U.S. Cl. 250—214
10 Claims

ABSTRACT OF THE DISCLOSURE

Surface finish inspection device employing a plurality of light sources for illuminating a surface, a scanner for generating an alternating signal whose peak-to-peak amplitude corresponds to the contrast of a scanned reflection of said light sources in said surface, and an electronic system for providing an indication when the peak-to-peak amplitude of the generated signal is below a predetermined value for a given period. In the electronic system, the generated scan signal is full-wave rectified, amplitude inverted, and keyed by a sampling signal (generated by direct scansion of an additional plurality of light sources), whereby error pulses are generated in response to any relatively rough areas of surface. Error pulses are supplied to an integrator, which triggers a threshold circuit if its output voltage exceeds a predetermined level, indicating that a relatively rough area exceeds a predetermined size.

---

This invention relates to a device for inspecting the surface finish of a body of material and more particularly to such a device employing a unique mechanical/optical/electrical system for providing an indication when a relatively rough area on said surface exceeds a predetermined size.

In the manufacture of certain items, for example, sheet steel blanks which are to be made into automobile bumpers or other highly finished items, it is desirable that the surface of the blanks have a predetermined level of smoothness after finishing operations. Blanks whose smoothness is less than a predetermined level in one or more areas thereof of greater than a predetermined size may not be suitable for further manufacturing operations, such as plating. Also, in a production line operation, the presence of a predetermined percentage of blanks with relatively rough areas may indicate the need for adjustment of prior finishing (e.g., grinding) operations. Accordingly, some type of inspection is desirable, either for singling out items having rough area of greater than a predetermined size, or for statistical quality control of prior finishing operations.

The disadvantages of manual inspection of the finished blanks are obvious to those familiar with mass production operations. Prior automatic inspection devices had disadvantages of complexity, lack of reliability, lack of accuracy, and lack of versatility. The device of the present invention overcomes these disadvantages.

Accordingly several objects of the present invention are: (1) to provide a new and improved type of automatic surface inspection device, and (2) to provide such a device which is highly accurate, reliable, versatile, and relatively simple in design.

SUMMARY

According to the present invention, a plurality of light sources are provided for illuminating a surface to be inspected. Means are provided for scanning the surface illuminated by these light sources to generate and alternating information signal whose peak-to-peak amplitude corresponds to the contrast of the scanned reflection of the light sources in the surface. Simultaneously, a standard pattern of light sources is scanned to generate a reference signal. The reference signal is processed to provide sampling pulses whose timing corresponds to the scanning times of the reflections of the light sources in the surface under inspection. The information signal is full-wave rectified, inverted, and sampled to provide error pulses which indicate the presence of relatively rough areas in the surface scanned. The error pulses are supplied to an integrator whose output triggers a threshold unit when the integrator's voltage exceeds a predetermined level, thereby indicating the presence of a relatively rough area of greater than a predetermined size in the surface scanned.

DRAWINGS

Figure 1:
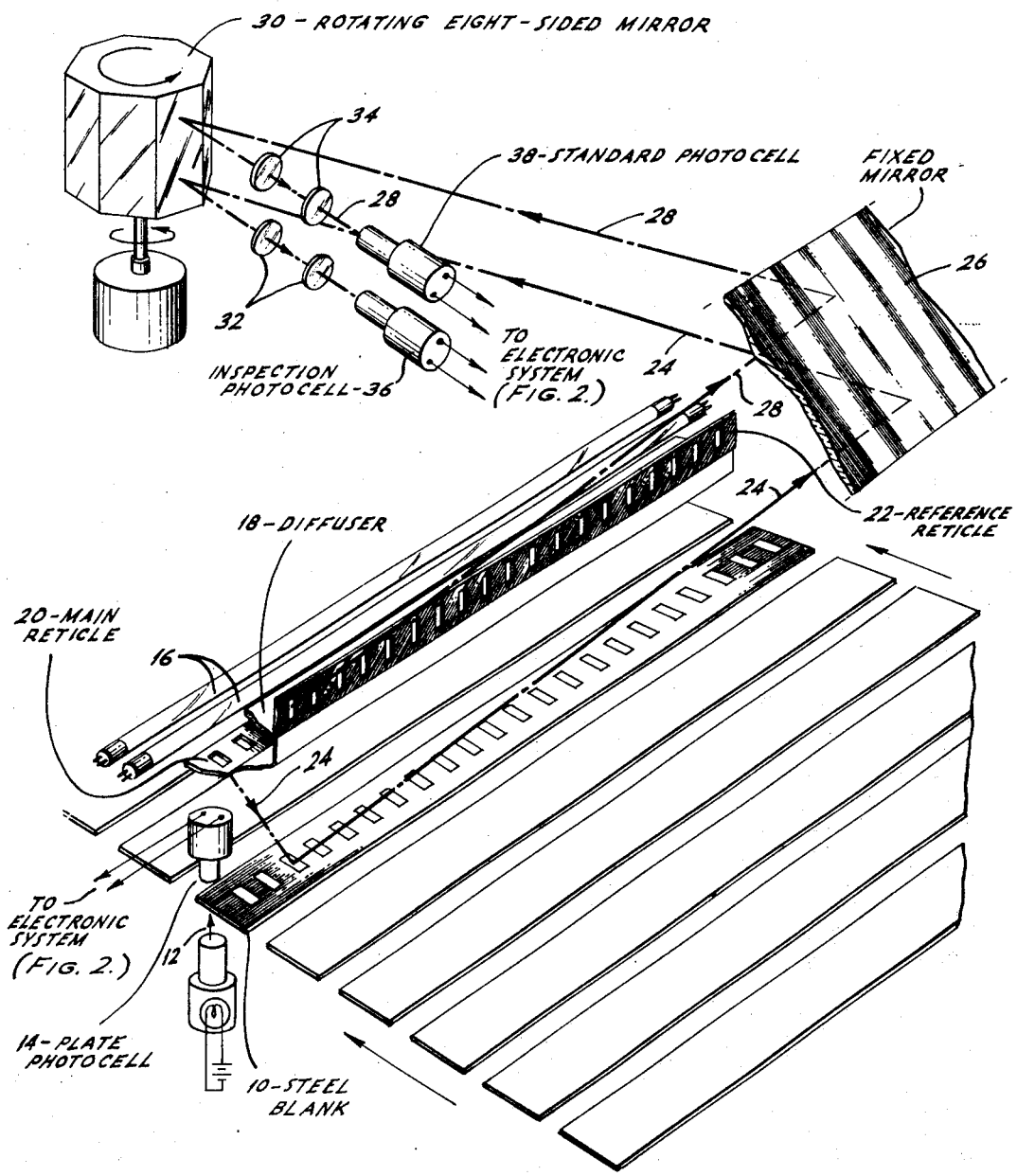
FIG. 1 is a diagram of the mechanical and optical system of a preferred embodiment of the invention.

FIG. 1—Mechanical and optical system—Description

To facilitate explanation, the invention will be described with reference to the inspection of flat, elongated steel blanks. However, the present invention is suitable for the surface finish inspection of any relatively smooth, light-reflecting surface. Also, for exemplary purposes, it will be assumed that the blanks to be inspected are about 7' x 3' in size and that they move along a conveyer belt (not shown) in a direction parallel to their shorter dimension at a speed of about 250' per minute. The blanks can also be arranged to move along the conveyor in a direction parallel to their longer dimension, if desired.

As one of the blanks 10, whose surface is to be inspected, moves along the conveyer to a position beneath the inspection device, it interrupts a light beam 12, terminating the electrical output of a plate photocell 14, which thereby enables the inspection device to begin an operating cycle, as discussed infra.

A light source comprising a plurality of fluorescent bulbs 16, a reflector/diffuser 18, a horizontal main reticle 20, and a vertical reference reticle 22 are provided above blank 10. The horizontal main reticle 20 comprises an opaque plate having a series 1" wide rectangular openings therein with a 1" spacing therebetween. The vertical reference reticle 22 is of similar construction except that its openings and spacings between openings are about 10% narrower than 1" (not illustrated) to compensate for the fact that the optical path from the reference reticle is shorter than the optical path from the main reticle, as discussed infra. The reticle openings extend along the entire length of each plate. Reticles 20 and 22 form part of an opaque enclosure (partially illustrated) which surrounds bulb 16 so that light from bulbs 16 can reach blank 10 and a photocell described below only via the openings in the reticles. The blank undergoing inspection preferably is shielded from ambient light by a further enclosure (not shown) so that substantially the only light reaching the blank comes through reticle 20.

Since light from bulb 16 passes through diffuser 18 and main reticle 20, the blank will be most intensely illuminated in the areas thereof directly under the openings in reticle 20 and will be less intensely illuminated in the remaining portions thereof, including the intermediate areas directly under the opaque portions of the reticle. The light incident on blank 10 is reflected upwardly to an angularly positioned, elongated, fixed mirror 26 which is only partially illustrated but which is long enough to reflect light from the entire length of blank 10 to a rotating mirror 30 (discussed infra). Path 24 represents the path of light from one of the openings in main reticle 20. Light from bulbs 16 is also reflected upwardly from diffuser 18 through reference reticle 22 to illuminate mirror 26 directly. Path 28, which is shorter than path 24, represents the path taken by light from one of the openings in reference reticle 22. After reflection from mirror 26, the main and reference beams follow respective paths 24 and 28 to impinge on one side of a vertically oriented, eight-sided mirror 30 which is rotated by the motor illustrated at about 100 r.p.m.

The two light beams are reflected from mirror 30 and pass through respective lens systems 32 and 34. The main beam finally impinges on an inspection photocell 36 and the reference beam finally impinges on a standard photocell 38. The outputs of the plate, inspection, and standard photocells 14, 36, and 38 are supplied to the electronic system of FIG. 2. Thus it will be seen that photocell 36 will view in succession each of the illuminated areas along a strip of blank 10 as each face of mirror 30 rotates past photocell 36 (i.e., for each eighth-revolution of mirror 30). Similarly, photocell 38 will scan each of the openings in reticle 22 for each eighth-revolution of mirror 30. Under the conditions given in this example, blank 10 advances approximately 4″ between successive scans.

Figure 2:
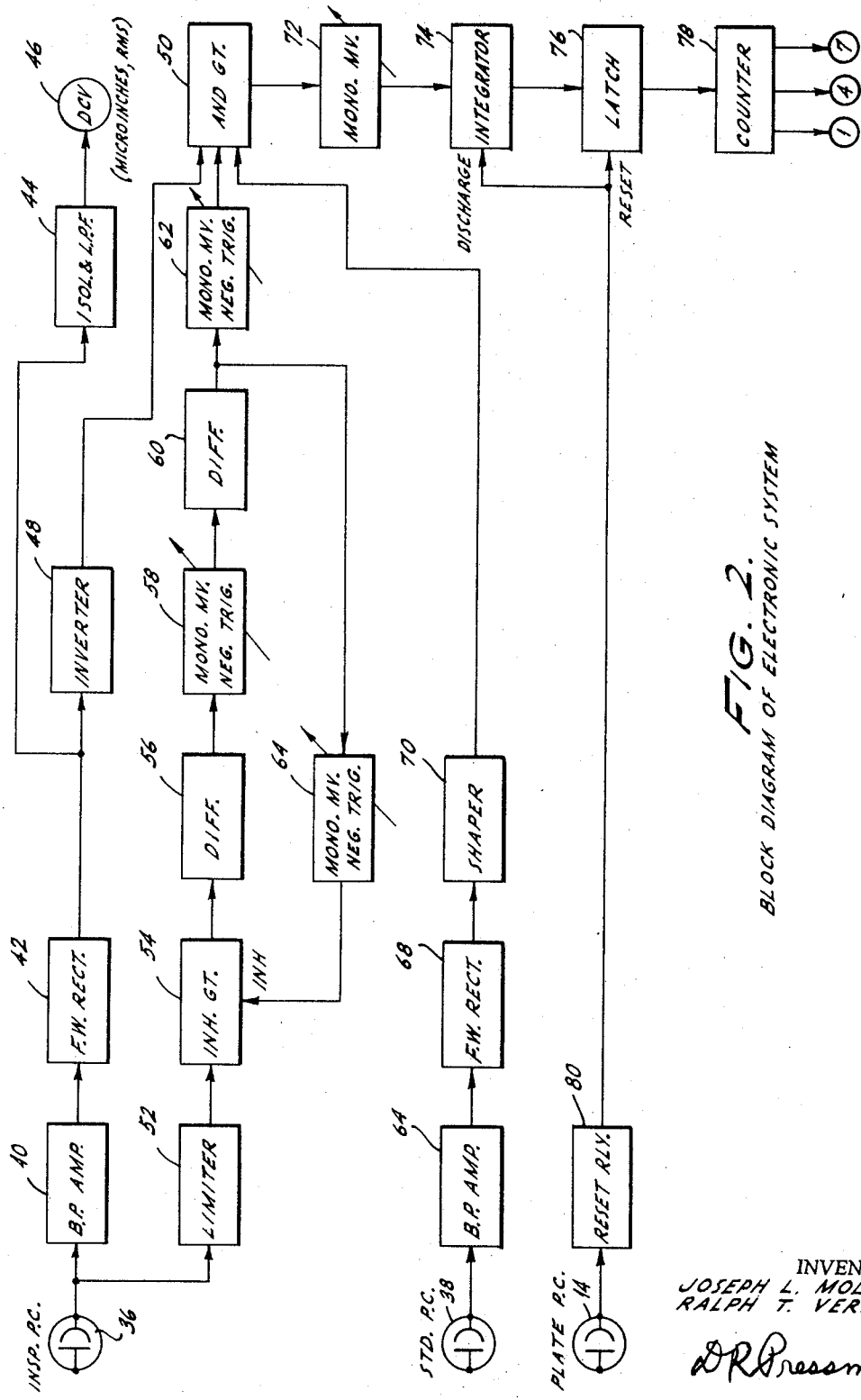
FIG. 2 is a block diagram of the electronic system of a preferred embodiment of the invention.

FIG. 2—Electronic system—Description

The scan signal from inspection photocell 36 is supplied in parallel to a limiter 52 and to an amplifier 40 which has a passband of about 8 Hz. to 2 kHz. The output of amplifier 40 is supplied to a full-wave rectifier 42. The output of rectifier 42 is supplied in parallel to an inverter 48 and to an isolation amplifier and low pass filter 44. The output of filter 44 drives a reverse-scaled DC voltmeter 46. That is, meter 46 is scaled so that a lower reading is obtained as its needle moves from left to right when the voltage supplied to the meter increases. The scale may be calibrated in microinches of surface roughness to indicate the average surface finish of the blank being inspected in root mean square (RMS) microinches. Calibration of meter 46 (from about 4 to 40 microinches) is accomplished by use of standard blanks of known finish.

The output of inverter 48 supplies the scan information to one input of a three-input AND gate 50.

The output of limiter 52 is supplied to a normally transmissive inhibit gate 54 which is rendered non-transmissive when the inhibit input thereof is energized. The output of gate 54 is supplied to a differentiator 56 whose output triggers and adjustable monostable multivibrator 58. The output of multivibrator 58 is supplied to a second differentiator 60 whose output triggers second and third adjustable monostable multivibrators 62 and 64. The output of multivibrator 64 energizes the inhibit input of gate 54 and the output of multivibrator 62 supplies a gating pulse to a second input of AND gate 50.

The output of standard photocell 38 supplies a reference signal via a second bandpass amplifier 64 and a second full-wave rectifier 68 to a pulse shaper 70 which is arranged to provide sharp sampling pulses in synchronism with the peaks of each of the pulses supplied thereto from rectifier 68. The sampling signal provided by shaper 70 is suplied to the third input of AND gate 50.

The output of AND gate 50 triggers a fourth adjustable monostable multivibrator 72 which supplies pulses of standard width and height to an integrator 74, which comprises a shunt charging capacitor and a fixed bleeder therefor. The output of integrator 74 is sensed by a latch circuit 76 which becomes set when the integrator's voltage exceeds a predetermined value. Latch circuit 76 may comprise a triggerable distable circuit. When latch circuit 76 is set, its output registers a count on a counter 78, which has output indicators to signal when progressively higher inputs have been received; in the present example counter 78 has indicators to signal reception of 1, 4, and 7 counts.

The output of plate photocell 14 is connected to a reset relay 80, whose output is in turn connected to a discharge input of integrator 74 and a reset input of latch 76. In response to an input from photocell 14, reset relay 80 will discharge the capacitor of integrator 74 and reset the latch circuit 76.

Typical, albeit idealized, waveforms which appear at the outputs of the components of FIGS. 1 and 2 are shown in the waveform diagrams of FIG. 3 which are referred to seriatim in the following discussion of the operation of the systems of FIGS. 1 and 2.

FIG. 1—Operation

The light falling on blank 10 from each of the plurality of separated light sources effectively provided by main reticle 20 follows paths similar to path 24 to mirror 26, then to mirror 30, and finally to photocell 36. The aperture of photocell 36 senses an area of the blank which is narrower than the width of the reflection of a single light area thereon. During each eighth-revolution of mirror 30, as a single face of the mirror passes photocell 36, an image of the entire blank, starting at one end and ending at the opposite end, will be swept past photocell 36. Photocell 36 will accordingly produce a signal whose peak-to-peak amplitude corresponds to the contrast of the reflection of the light sources along a strip of the blank. The signal produced by photocell 36 during scansion of a strip of the blank is shown by the solid waveform by the solid waveform of FIG. 3 labeled INSP. PC 36. Since blank 10 is continuously moving through the inspection area, the entire blank will be scanned by photocell 36 in a series of adjacent, parallel scan paths, thereby producing a plurality of waveforms similar to INSP. PC 36 in response to each blank.

If the finish on blank 10 is very smooth, the reflection of each light aperture of reticle 20 thereon will be sharply defined since most of the light will be specularly reflected. Accordingly, the signal generated by photocell 36 will have a large peak-to-peak amplitude as the sharply defined light areas on blank 10 are scanned. Portion 82 of the INSP. PC 36 waveform is representative of scansion of a relatively smooth area. The negative DC component of this waveform is caused by the increase in light received by the photocell due to diffuse reflection of light from the apertures in reticle 20 from blank 10. Although not illustrated, this DC component will actually be larger as the center of the blank is scanned than when the edges are scanned since the light level is larger at the center than at the edges.

When the finish on blank 10 is relatively rough, so that more diffuse reflection results, the reflection of the light apertures from reticle 20 in the blank will be less sharply defined; accordingly the peak-to-peak amplitude of the INSP. PC 36 waveform will be greatly reduced, as indicated by portion 84 thereof.

While the image of the main reticle on blank 10 is scanned by photocell 36, the optical system including reference photocell 38 and mirror 30 will simultaneously and synchronously scan reference reticle 22 via optical paths similar to path 28 to provide a reference signal, labeled STD. PC 38 in FIG. 3. Waveform STD. PC 38 is similar to the INSP. PC 36 waveform and is shown in FIG. 3 by a broken line superimposed thereover. However since the image of reference reticle 22 is never reflected from any diffuse surface and is always viewed directly, the STD. PC 38 waveform always has a uniform high peak-to-peak amplitude.

FIG. 2—Operation

Figure 3:
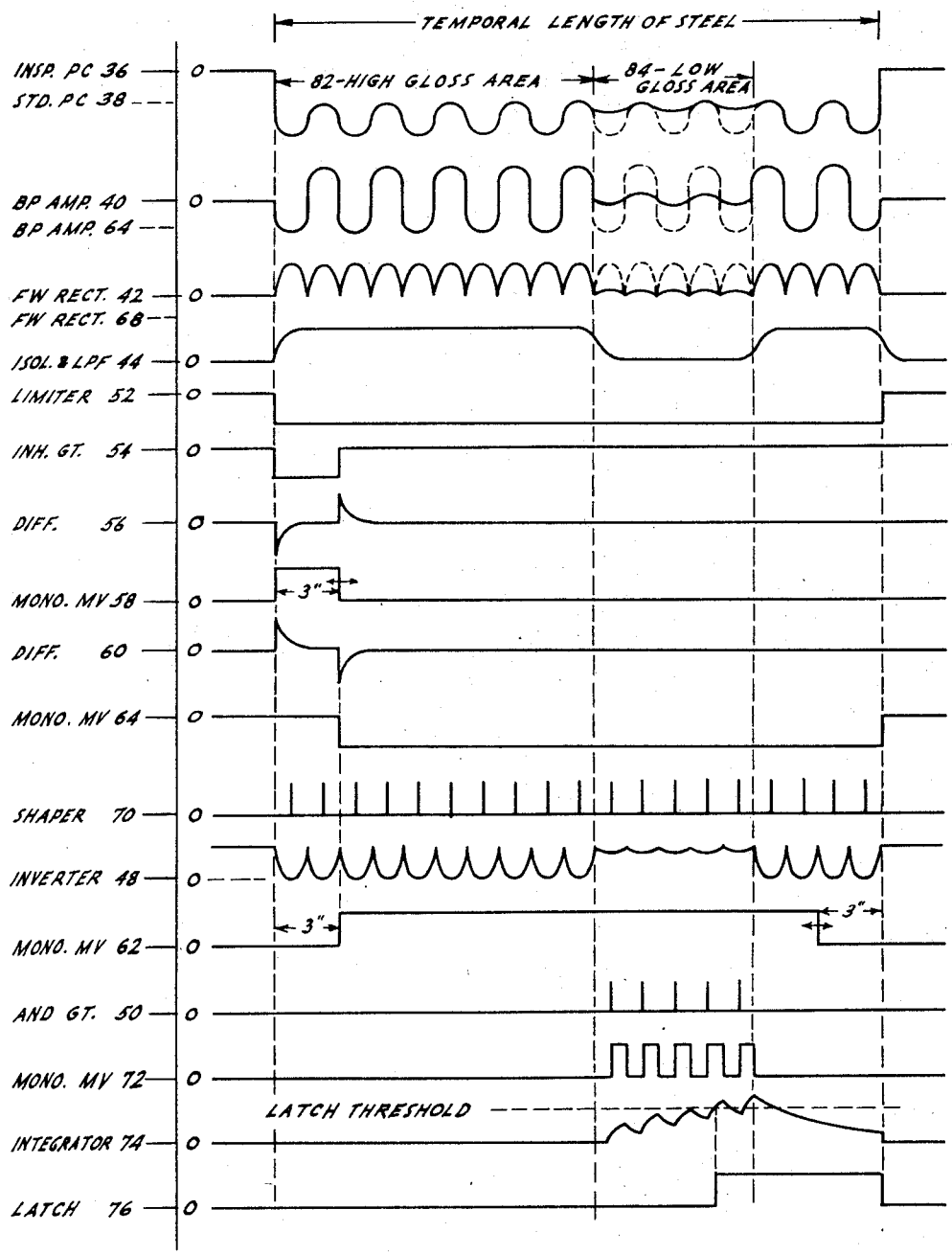
FIG. 3 is a diagram of voltage waveforms present in the systems of FIGS. 1 and 2.

As the signals from the inspection and standard photocells are translated through the respective bandpass amplifieras 40 and 64 of FIG. 2, their negative DC components will be removed, producing two bipolar signals in the form of rounded square waves, labeled BP AMP. 40 and BP AMP. 64, which are also shown superimposed in FIG. 3. Note that when the low-gloss area is scanned (period 84) the peak-to-peak amplitude of the BP AMP. 40 waveform is much lower than when the high gloss area is scanned (period 82).

After translation through the respective full-wave rectifiers 42 and 68, the negative peaks of each of the bipolar signals will be inverted, producing two unipolar pulse signals, labeled FW RECT. 42 and FW RECT. 68, which are also shown superimposed. Again, the waveform of these signals is a rounded square wave.

During translation through low pass filter 44, the alternating current component will be removed from the FW RECT. 42 signal, producing the slowly varying direct current signal labeled ISOL. & LPF 44. During scansion of the relatively smooth area, the ISOL. & LPF 44 signal will have a high amplitude, whereby voltmeter 46 will show a low reading for the average surface finish in RMS michroinches. During the scansion of the relatively rough area, the ISOL. & LPF 44 signal will have a low value, whereby meter 46 will show a high reading in RMS microinches.

The signal from inspection photocell 36 is also supplied to limiter 52, which effectively removes the alternating current component therefrom to provide a negative DC signal pulse, labeled LIMITER 52; the length of this pulse is proportional to the width of the steel. For reason discussed infra, only the initial portion of the LIMITER 52 pulse is passed by inhibit gate 54, thereby producing a short output pulse, labeled INH. GT. In response to this pulse, differentiator 56 produces a signal, labeled DIFF. 56, consisting of a sharp negative pulse followed by a sharp positive pulse. The negative pulse triggers multivibrator 58, which provides a positive pulse, labeled MONO. MV 58, whose width is adjusted (for reason discussed below) to terminate when the scanned point is approximately three inches in from the end of the steel blank nearest the start of the scan.

In response to the MONO. MV 58 pulse, differentiator 60 produces sharp positive and negative pulses, labeled DIFF. 60. The negative pulse triggers multivibrator 64, which produces a negative pulse, labeled MONO. MV 64, whose length is sufficient to render inhibit gate 54 nontransmissive until the scan path is completed. This terminates the output of gate 54 so that further impulses in the output signal from photocell 36 cannot affect the channel presently under consideration.

Returning to rectifier 68, its output is supplied to shaper 70 which provides the sharp sampling pulses, labeled SHAPER 70, in synchronism with the maxima of the FW RECT. 68 signal. Shaper 70 may consist of a limiter to provide rectangular unipolar pulses from the rounded unipolar pulses, a differentiator to provide sharp triggering pulses from the rectangular pulses, a monostable multivibrator responsive to the sharp pulses to provide pulses of fixed duration whose trailing edges coincide with the maxima of the FW RECT. 68 pulses, a second differentiator for producing sharp positive and negative pulses, and a clipper for passing only the sharp positive pulses, which occur at the maxima. The sampling signal from sharper 70 is supplied to one input of AND gate 50.

The FW RECT. 42 pulses are supplied to inverter 48, which inverts the amplitude (not polarity) of the full-wave rectifier scan signal, producing a scan information signal, labeled INVERTER 48, which is at ground at the peaks of the FW RECT. 42 signal when the relatively smooth area is scanned (period 82), but which has a positive value at the peaks of the FW RECT. 42 signal when the relatively rough area is scanned (period 84). The scan information signal from inverter 48 is supplied to a second input of AND gate 50.

Returning to the DIFF. 60 signal, the negative output pulse thereof triggers multivibrator 62, whose output is a positive gating pulse, labeled MONO. MV 62, which begins when the point scanned is theree inches in from one end of the blank and which is adjusted to terminate when the point scanned is three inches in from the opposite end of the blank. This gating pulse is supplied to the third input of AND gate 50.

In order for AND gate 42 to produce an output, all three input signals thereto must be positive, i.e., a sampling pulse from shaper 70 must be present, the gating pulse from multivibrator 62 must be present, and the signal form inverter 48 must exceed a predetermined positive level, as occurs during scansion of the relatively rough area (period 84). During period 84 these conditions will be satisfied at the times when the SHAPER 70 sampling pulses are present; hence during period 84 the output of AND gate 50 will be a series of positive pulses, labeled AND GT. 50 in FIG. 3, indicating the presence of a relatively rough area. During scansion of a relatively smooth area (period 82), the output of inverter 48 will not be positive when the SHAPER 70 sampling pulses occur and hence no output will be supplied by AND gate 50 during period 82. The function of the gating signal from multivibrator 62 is effectively to enable AND gate 50 only when the center portion of the steel blank is scanned inasmuch as the initial and trailing edge portions of the blank are trimmed away in subsequent processing operations in the example illustrated so that no scan information is desired therefrom. By adjusting multivibrators 58 and 62, the length of the gating signal and hence area of the blank effectively scanned can be adjusted as desired.

The error pulses from AND gate 50 trigger multivibrator 72 which provides pulses, labeled MONO. MV 72, which have a fixed width and amplitude. These pulses charge the capacitor in integrator 74, whose resultant output, labeled INTEGRATOR 74, is a step-type signal which decays gradually upon termination of the MONO. MV 72 pulses. This signal is sensed by circuit 76, which becomes set and produces an output, labeled LATCH 76, when the input voltage thereto reaches the latch circuit's threshold level, as indicated. The circuit parameters in multivibrator 72, integrator 74, and latch 76 are selected so that the latch will become set only in response to a predetermined number of adjacent error pulses from AND gate 50, indicative of a relatively rough area of at least a predetermined size (e.g., 4 sq. in.) on the blank.

If a plurality of relatively rough areas are encountered on a blank which are separated from each other, the AND GT. 50 error pulses will not be adjacent. The omission of one or more pulses in waveform AND GT. 50 will provide more time for the capacitor in integrator 74 to discharge between pulses; thus a greater number of error pulses will be required to trigger latch circuit 76. Hence latch 76 can be triggered either in response to one relatively rough area of a predetermined size or a plurality of relatively rough areas whose combined size is greater than said predetermined size, depending on the amount of separation between the relative rough areas.

In response to the output from latch circuit 76, counter 78 will register a count of one and its "1" indicator will be illuminated.

Returning to FIG. 1, after blank 10 leaves the inspection area, light beam 12 will again impinge on plate photocell 14, which accordingly will provide an output, triggering reset relay 80 of FIG. 2. Relay 80 will discharge the capacitor in integrator 74 and reset latch circuit 76, thereby terminating the output signals from these two components, as illustrated. Subsequent steel blanks will be analyzed in similar fashion. Counter 78 will record the number of blanks whose finish quality is low enough to trigger latch 76. By providing additional means (not shown) for counting the number of steel blanks which pass the inspection station and observing the tally on counter 78 of blanks with one or more relatively rough areas of greater than the predetermined size, it is possible to keep track of the percentage of such blanks which have an inferior finish. This information can be used to adjust prior finishing operations. Alternatively, the output of latch 76 can be used to activate means for marking blanks whose surface finish is inferior.

What is claimed is:

1. A device for analyzing the smoothness of the finish of the surface of a body of material, comprising:
   (a) means for illuminating said surface with a plurality of separated light sources spaced from said surface, and
   (b) means for (1) scanning said surface along a path which traverses the reflections of said light sources in said surface, the dimension of the area scanned along said path being less than the apparent size of said light sources in the reflections of said light sources in said surface, and (2) producing a scan signal whose instantaneous amplitude is proportional to the brightness of the area of the path being scanned.

2. The device of claim 1 further including means for providing a predetermined output according to the amplitude of said scan signal.

3. The device of claim 1 wherein said (b) means comprises a photoresponsive cell spaced from said surface and a rotating mirror for causing an image of said surface to be swept past said cell.

4. The device of claim 3 wherein said mirror has a plurality of flat reflecting surfaces which are parallel to the axis of rotation of the mirror and further including means for moving said body of material in direction normal to the direction of said scanning so as to cause said surface thereof to be scanned in a series of adjacent parallel scan paths.

5. The device of claim 1 wherein said (a) means comprises an elongated light source and an elongated reticle positioned between said source and said surface, said reticle having a series of openings alternating with opaque strips along the length thereof, said reticle being positioned parallel to said light source and said surface.

6. The device of claim 1 further including means for deriving from said scan signal an alternating voltage representative of the variations in brightness of said surface said said path is scanned, means for full-wave rectifying said alternating voltage to provide unipolar pulses, and means for providing a predetermined response if a predetermined number of adjacent ones of said pulses do not exceed a predetermined amplitude.

7. The device of claim 6 wherein said means for providing a predetermined response comprises a storage capacitor and associated discharge means for storing a charge from said pulses and dissipating said charge at a rate proportional to said stored charge, and a threshold circuit for providing said predetermined response when the voltage on said capacitor reaches a predetemined value.

8. The device of claim 6 further including a means for providing a train of sampling pulses which occur at the peaks of said unipolar pulses, an inverter for providing an inverted amplitude version of said unipolar pulses, and an AND gate responsive to said sampling pulses and said inverted unipolar pulses for providing a pulse each time one of said unipolar pulses does not exceed a predetermined amplitude.

9. The device of claim 1 further including means providing a plurality of separated light sources corresponding in number to said first-named plurality of light sources, means for scanning across said light sources in synchronism with said first-named scanning means to produce a reference signal whose amplitude varies in accordance with the brightness of the path scanned, and means responsive to said scan signal and said reference signal for providing at least one pulse each time the amplitude of a cycle of said scan signal is below a predetermined value.

10. The device of claim 9 wherein said responsive means comprises for deriving alternating current signals from said scan signal and said reference signal, respectively, means for full-wave rectifying each of said alternating current signals, an AND gate, means for amplitude inverting the derived, rectified scan signal and supplying the resultant signal to one input of said AND gate, means for producing a train of sampling pulses in synchronism with the peaks of the derived, rectified reference signal and supplying said sampling pulses to another input of said AND gate, whereby said AND gate will provide an output pulse each time the amplitude of said derived, rectified scan signal is below a predetermined value, a monostable multivibrator for supplying a pulse of predetermined amplitude and length in response to each of said output pulses, a capacitor for accumulating a charge in response to said last-named pulses and dissipating said charge at a predetermined rate, and a threshold circuit for producing a predetermined output in response to a predetermined voltage on said capacitor.

References Cited

FOREIGN PATENTS 1,135,689  8/1962  Germany.

RALPH G. NILSON, Primary Examiner

T. N. GRIGSBY, Assistant Examiner

U.S. Cl. X.R.

250—219, 220; 356—200, 211

PO-1050
(5/69)

UNITED STATES PATENT OFFICE
CERTIFICATE OF CORRECTION

Patent No. 3,509,349        Dated April 28, 1970

Inventor(s) Joseph L. Molines and Ralph T. Vernot

It is certified that error appears in the above-identified patent and that said Letters Patent are hereby corrected as shown below:

Claim 10, column 8, line 22, after "comprises" insert -- means --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents